US012383447B2

(12) United States Patent
Gunderson et al.

(10) Patent No.: US 12,383,447 B2
(45) Date of Patent: Aug. 12, 2025

(54) SHOWER/COMMODE WHEELED CHAIR

(71) Applicant: Altimate Medical Holdings, Inc., Morton, MN (US)

(72) Inventors: Jeff Gunderson, Redwood Falls, MN (US); Trevor Andrew Bartz, Prinsburg, MN (US); Matthew Haugen, Hector, MN (US); David Schon, Redwood Falls, MN (US); Wesley Lee Ovre, Redwood Falls, MN (US); Mark Joseph Schmitt, Atwater, MN (US); David Paul Scott, Overland Park, KS (US)

(73) Assignee: ALTIMATE MEDICAL HOLDINGS, INC., Morton, MN (US)

( * ) Notice: Subject to any disclaimer, the term of this patent is extended or adjusted under 35 U.S.C. 154(b) by 164 days.

(21) Appl. No.: 18/457,932

(22) Filed: Aug. 29, 2023

(65) Prior Publication Data

US 2024/0091084 A1 Mar. 21, 2024

Related U.S. Application Data

(60) Provisional application No. 63/407,495, filed on Sep. 16, 2022.

(51) Int. Cl.

*A61G 5/10* (2006.01)
*A61G 5/02* (2006.01)
*A61G 5/12* (2006.01)

(52) U.S. Cl.

CPC ........... *A61G 5/1002* (2013.01); *A61G 5/022* (2013.01); *A61G 5/128* (2016.11)

(58) Field of Classification Search

CPC ....... A61G 5/1002; A61G 5/128; A61G 5/022
USPC ........................................................... 4/480
See application file for complete search history.

(56) References Cited

U.S. PATENT DOCUMENTS

| | | | | |
|---|---|---|---|---|
| D389,099 S * | 1/1998 | McKay | D12/128 | |
| 6,176,508 B1 | 1/2001 | Malassigne et al. | | |
| 9,421,138 B1 | 8/2016 | Slater | | |
| 2003/0030251 A1 | 2/2003 | Malassigne et al. | | |
| 2006/0170183 A1* | 8/2006 | Wendt | A61G 5/12 | 280/250.1 |
| 2008/0265548 A1* | 10/2008 | Hammer | A61G 5/0875 | 29/428 |
| 2008/0290711 A1* | 11/2008 | Fernie | A61G 5/1002 | 4/450 |

(Continued)

FOREIGN PATENT DOCUMENTS

| | | |
|---|---|---|
| CN | 109419591 A | 3/2019 |
| JP | 2022114840 A | 8/2022 |

OTHER PUBLICATIONS

Raz Design Inc., Flip-Back Footrest _ Mobile Shower Commode Chairs, @2023.

(Continued)

*Primary Examiner* — Huyen D Le
(74) *Attorney, Agent, or Firm* — Fredrikson & Byron, P.A.

(57) ABSTRACT

A shower/commode wheeled chair adapted to be locatable over a commode, the shower/commode wheeled chair comprising a frame, a seat support portion, a front portion extending downwardly from the seat support portion, a back support, a shower/commode seat, wheels and a footrest coupled to the front portion.

32 Claims, 20 Drawing Sheets

(56) References Cited

U.S. PATENT DOCUMENTS

| | | | | |
|---|---|---|---|---|
| 2010/0007114 | A1* | 1/2010 | Papi | A61G 5/028<br>280/281.1 |
| 2021/0100702 | A1* | 4/2021 | Su | A61G 5/024 |
| 2021/0361500 | A1* | 11/2021 | Lai | A61G 5/0816 |
| 2022/0233375 | A1* | 7/2022 | Mullins | A61H 3/04 |
| 2023/0233387 | A1* | 7/2023 | Garven, Jr. | A61G 5/128<br>280/281.1 |
| 2024/0293275 | A1* | 9/2024 | Li | A61G 5/1048 |

OTHER PUBLICATIONS

Raz Design Inc., MFX-12 Foot Supports_ Mobile Shower Commode Chairs, @2023.

Invitation to Pay Additional Fees, issued in corresponding International Application No. PCT/US2023/073097 dated Dec. 4, 2023, 18 pgs.

International Searching Authority, "International Search Report and Written Opinion", for PCT Application PCT/US2023/073097, Mailed Jan. 29, 2024, pp. 1-23.

* cited by examiner

SHOWER/COMMODE WHEELED CHAIR

RELATED APPLICATIONS

This application claims priority to U.S. Provisional Patent Application No. 63/407,495, filed Sep. 16, 2022, the entire contents of which are incorporated herein by reference.

TECHNICAL FIELD

In general, this disclosure is directed to a shower/commode wheeled chair for use by patients and elderly and/or injured individuals in conjunction with movement or positioning relative to a shower or commode/toilet.

BACKGROUND

Shower/commode wheeled chairs have been used to help position hospital patients and elderly and/or injured individuals as needed to perform certain routine, daily activities, such as showering and or use of bathroom facilities. There is a need for improvement in the adjustability, storage, and/or flexibility in the use of such devices.

SUMMARY

In some embodiments of this disclosure, a shower/commode wheeled chair is adapted to be locatable over a commode, the shower/commode wheeled chair comprising a frame, a seat support portion, a front portion extending downwardly from the seat support portion, a back support, a shower/commode seat, wheels and a footrest coupled to the front portion, wherein the footrest is configured to pivot about a generally horizontal axis. In some embodiments, the footrest may also be (or may alternately be) configured to rotate about a generally vertical axis.

In some embodiments of this disclosure, a shower/commode wheeled chair is adapted to be locatable over a commode, the shower/commode wheeled chair comprising a frame, a seat support portion, a front portion extending downwardly from the seat support portion, a back support, a shower/commode seat, wheels and one or more arm rests having an attachment portion with a catch/latch mechanism, and an arm support portion, wherein the arm support portion includes a spring release mechanism that enables pivoting of the arm support portion relative to the attachment portion by displacing the arm support portion a horizontal distance.

In some embodiments, of this disclosure, a shower/commode wheeled chair is adapted to be locatable over a commode, the shower/commode wheeled chair comprising a frame, a seat support portion, a front portion extending downwardly from the seat support portion, a back support, a shower/commode seat, and a plurality of wheels including at least two rear wheels, wherein at least one of the rear wheels is formed of an injection molded plastic having a plurality of internal hollow portions and a metal band positioned to cover the hollow portions and form a support for an inner tube, wherein the injection molded plastic of the at least one rear wheel is formed by a process that involves removing one or more removable core elements.

The details of one or more examples are set forth in the accompanying drawings and the description below. Other features, objects, and advantages will be apparent from the description and drawings, and from the claims.

DETAILED DESCRIPTION

This disclosure relates generally to shower/commode wheeled chairs that may be used by patients and elderly and/or injured individuals, and by caregivers for such individuals, in conjunction with movement or positioning relative to a shower or commode/toilet, for example for use during certain routine daily activities of life.

Figure 1:
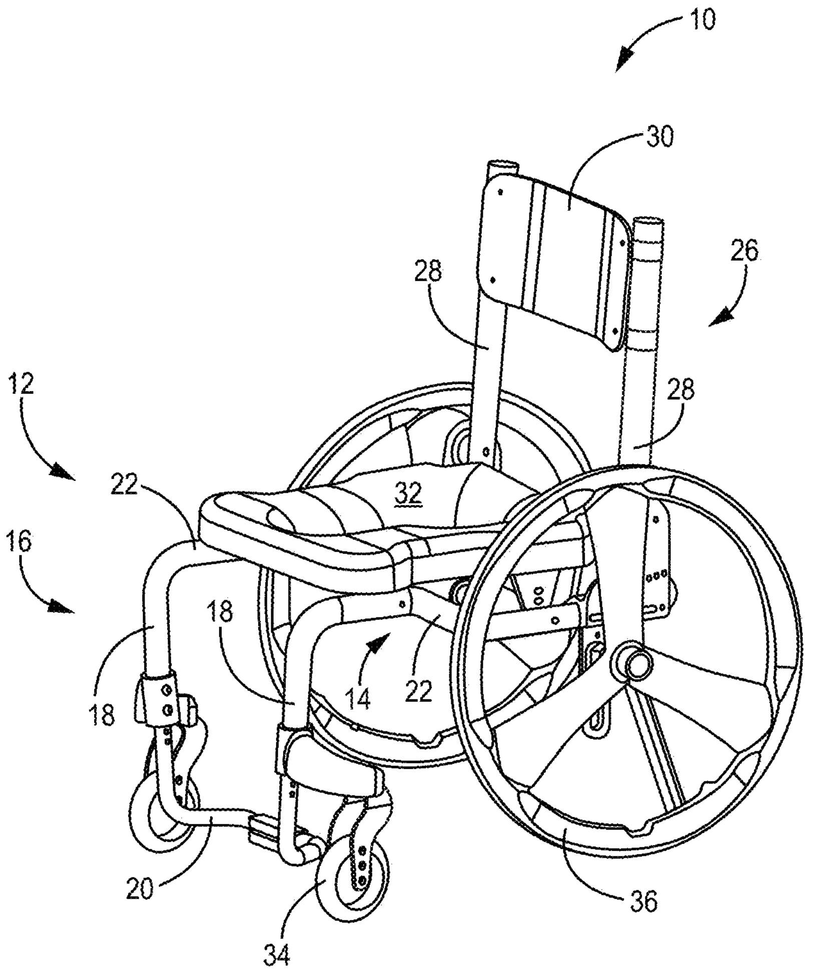
FIG. 1 is a perspective view of a shower/commode wheeled chair in accordance with some embodiments of this disclosure.

FIG. 1 is a perspective view of a shower/commode wheeled chair 10 adapted to be locatable over a commode, but which could also be used in a shower setting, for example. The shower/commode wheeled chair 10 of FIG. 1 comprises a frame 12, which may comprise a seat support portion 14 and a front portion 16 that extends downwardly from the seat support portion 14. Frame 12, including the seat support portion 14 and the front portion 16, may be formed of a tubular material, for example. The tubular portions of frame 12 may, for example, be formed of a lightweight metal, such as aluminum, or of other metals, or of plastic or composite materials, for example. The tubular nature of frame 12 may include hollow portions having circular, or semi-circular, or oval cross-sectional shapes, for example. An oval cross-sectional shape may, for example, provide advantages in terms of structural or weight-bearing support capabilities (e.g., an oval having its longer width directed vertically may provide the ability to support more weight than if oriented horizontally, for example). An oval shape may also provide advantages over a circular shape in areas where there is coupling between two components; for example, an oval shape would resist relative rotation between two radially coupled components as compared to a circular coupling.

With continued reference to the shower/commode wheeled chair 10 of FIG. 1, front portion 16 may comprise left and right frame elements 18. Left and right frame elements 18 may extend downwardly and may present a generally vertical orientation, as is seen in FIG. 1. In some embodiments, a front cross member 20 may be employed to couple the left and right frame elements 18 of the front portion 16 near a bottom portion of front portion 16, according to some embodiments. Seat support portion 14 may comprise left and right frame elements 22 with generally horizontally oriented portions, as shown. In some embodiments, seat support portion 14 may also include a rear cross member 24 (see FIG. 6B), which may be arranged to couple the left and right frame elements 22 of the seat support portion 14 near a rear portion thereof. The seat support portion 14 of the frame 12 may be supported (e.g., by a plurality of wheels 34, 36 coupled to the shower/commode wheeled chair 10) to thereby define a space beneath the seat support portion 14 to facilitate moving the shower/commode wheeled chair 10 over a commode/toilet, according to some embodiments.

Back support 26 may be coupled to the seat support portion 14 in some embodiments and may comprise left and right frame elements 28 extending upwardly (e.g., generally vertically from seat support portion 14), and may include a back support surface 30 extending between the left and right frame elements 28 of the back support 26, for example. A shower/commode seat 32 may be disposed on and/or supported by the seat support portion 14 of the frame 12, as shown in FIG. 1. Shower/commode wheeled chair 10 may further comprise a plurality of wheels 34, 36 coupled to the frame 12 and configured to movably support the frame 12 for transporting a patient seated thereon. In the embodiment shown in FIG. 1, there are two front wheels 34 and two rear wheels 36, although this is exemplary and other alternate configurations are contemplated by this disclosure.

Figure 2A:
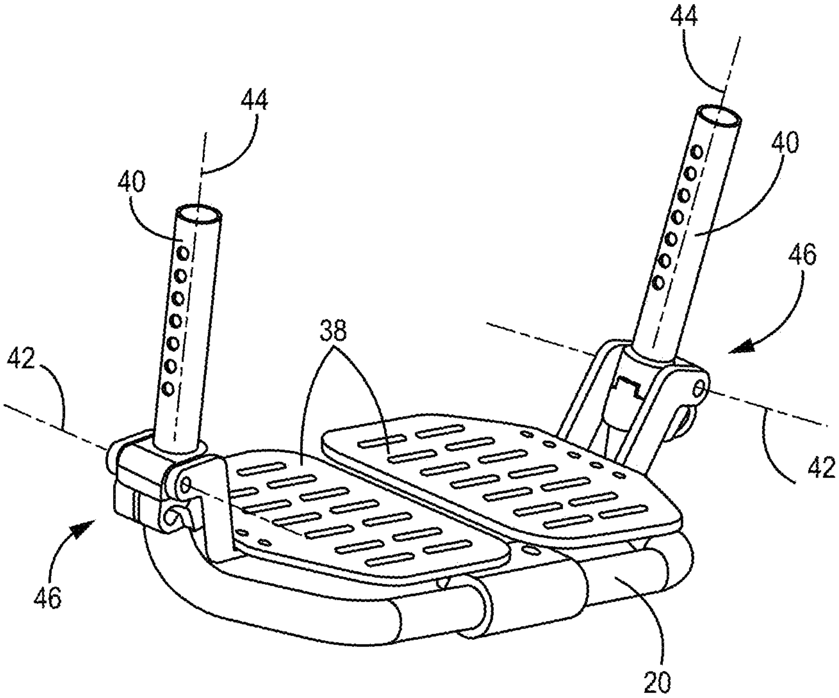
FIGS. 2A-2D are perspective views of a footrest and/or a footrest coupling that may be used in conjunction with a shower/commode wheeled chair according to some embodiments of this disclosure.
Figure 2B:
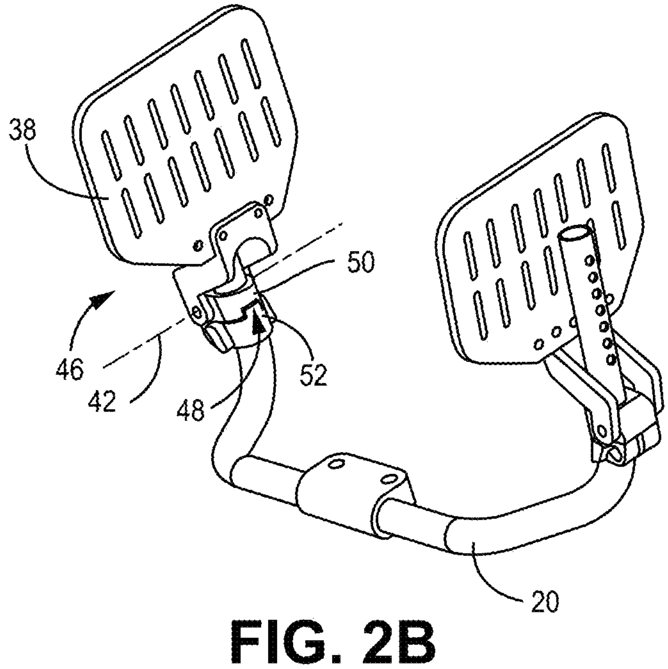

In some embodiments, shower/commode wheeled chair 10 may be configured to include one or more footrests 38 coupled to (including being releasably coupled to) the front portion 16 of a shower/commode wheeled chair 10 of this disclosure. Embodiments of a footrest 38 (and/or a footrest coupling 46) for use with the shower/commode wheeled chair 10 are shown in the perspective views of FIGS. 2A-2D. For example, FIG. 2A shows a pair of footrests 38 (e.g., a left footrest 38 and a right footrest 38) coupled to a front cross member 20 of shower/commode wheeled chair 10. (The front cross member 20 is shown in isolation from the shower/commode wheeled chair 10 in FIGS. 2A-2D.) In the particular embodiment shown in FIG. 2A, each of the footrests 38 is coupled to an upwardly extending portion 40 of front cross member 20 (e.g., to a left and a right upwardly extending portion 40). The footrest 38 may be pivotably coupled to the upwardly extending portion 40 to enable pivoting of the footrest 38 about a generally horizontal axis 42, as seen in FIGS. 2A and 2B, for example. In some embodiments, footrest 38 may also be (or may alternatively be) rotatably coupled to the upwardly extending portion 40 to thereby enable rotation of footrest 38 about a generally vertical axis 44, according to the embodiments shown in FIGS. 2A-2C, for example.

Figure 2C:
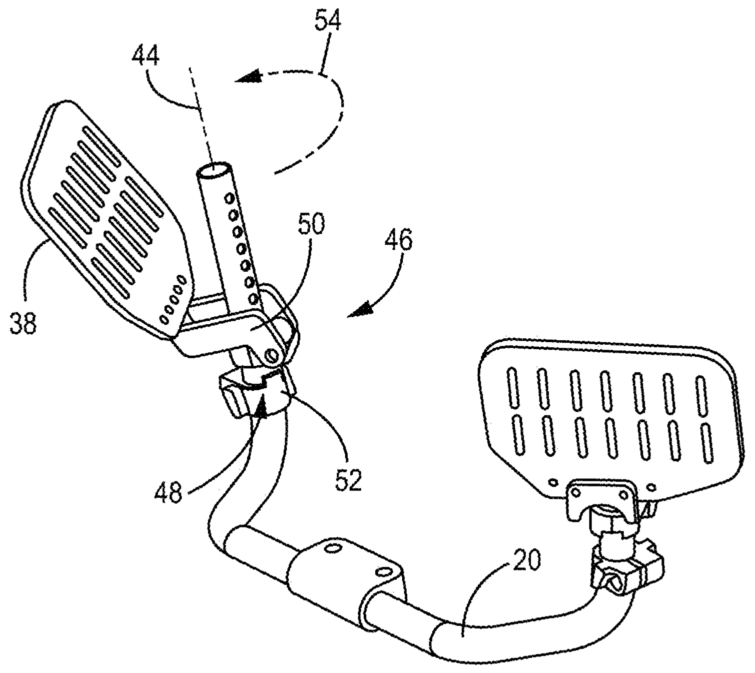

In the embodiments shown in FIGS. 2A-2C, each of the footrests 38 are coupled to an upwardly extending portion 40 of a front cross member 20. As shown, footrest 38 is configured to rotate about the respective upwardly extending portion 40 of the front cross member 20; that is, footrest 38 rotates about a generally vertical axis 44 that is close to (e.g., coincident with) the centerline or axis of the associated upwardly extending portion 40. This may, for example, result in a more compact or convenient or efficient design as compared to other configurations where the footrest 38 is coupled at a location somewhat offset from the upwardly extending portion 40.

It should be noted that one or more footrests 38 could alternatively be coupled to a left frame element 18 or a right frame element 18 of the downwardly extending portion of front portion 16. This alternate embodiment would allow footrest 38 to rotate about an axis generally formed by the right or left frame element 18 of the downwardly extending front portion 16, and it would provide similar advantages as those described with respect to the embodiments depicted in FIGS. 2A-2D above.

Figure 2D:
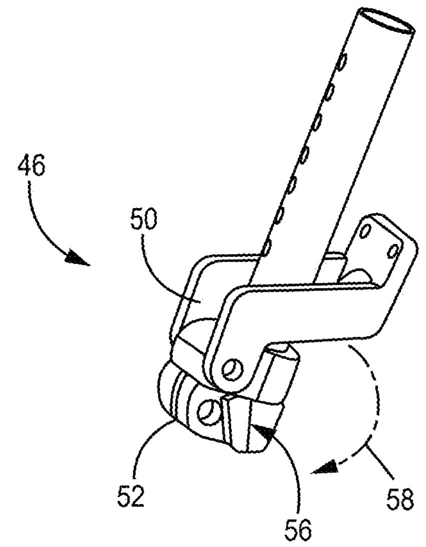

With continued reference to FIGS. 2A-2D, the footrest 38 may be coupled to an upwardly extending portion 40 of a front cross member 20 (or, in alternate embodiments, to the downwardly extending portion of front portion 16) via a footrest coupling 46, substantially as shown. For example, as shown in FIGS. 2B-2D, footrest coupling 46 may comprise an upper portion 50 and a lower portion 52. Upper portion 50 and lower portion 52 may each include an indexing feature 48 (see FIGS. 2B and 2C) that enables the footrest coupling 46 to be selectively rotated; that is, upper portion 50 may be selectively rotated relative to lower portion 52 as indicated by reference numeral 54 in FIG. 2C (showing rotation of footrest 38 about axis 44 to move footrest 38 to an outward position to facilitate patient egress/ingress, for example). In some embodiments, the selective rotation of upper portion 50 relative to lower portion 52 may be effected or enabled by vertical displacement (e.g., vertical separation) between upper portion 50 and lower portion 52; this may, for example, involve vertical displacement against spring tension that normally biases upper portion 50 toward lower portion 52 into a mating engagement, for example. Indexing feature 48, as shown in FIGS. 2B and 2C may comprise a notched mating feature as shown, or some other type of shaped engagement that limits or prevents rotation of upper portion 50 and lower portion 52 relative to each other unless and until there is at least some level of vertical displacement therebetween. As shown, lower portion 52 remains securely fastened to upwardly extending portion 40 (e.g., it does not rotate from its original orientation) during rotation of upper portion 50 about the upwardly extending portion 40. FIG. 2D shows an additional or optional feature that may be part of footrest coupling 46. For example, footrest coupling 46 may include a stop 56 shaped and positioned on footrest coupling 46 (e.g., formed in lower portion 52) to facilitate pivoting and/or positioning (e.g., to limit downward movement when pivoting about horizontal axis 42, for example) of footrest 38 into a configuration for supporting a patient's foot (as indicated by the downward pivoting of footrest 38 shown by reference numeral 58). In some embodiments, footrest coupling 46 may be disposed coaxially with the right or left upwardly extending portions 40 (or, in alternate embodiments, disposed coaxially with a right or left frame element 18 of the downwardly extending portion of front portion 16). In certain embodiments, the footrest coupling 46 may be configured to enable removal from frame 12 of the shower/commode wheeled chair 10, for example, via a pushbutton release or other suitable release mechanism.

Figure 2E:
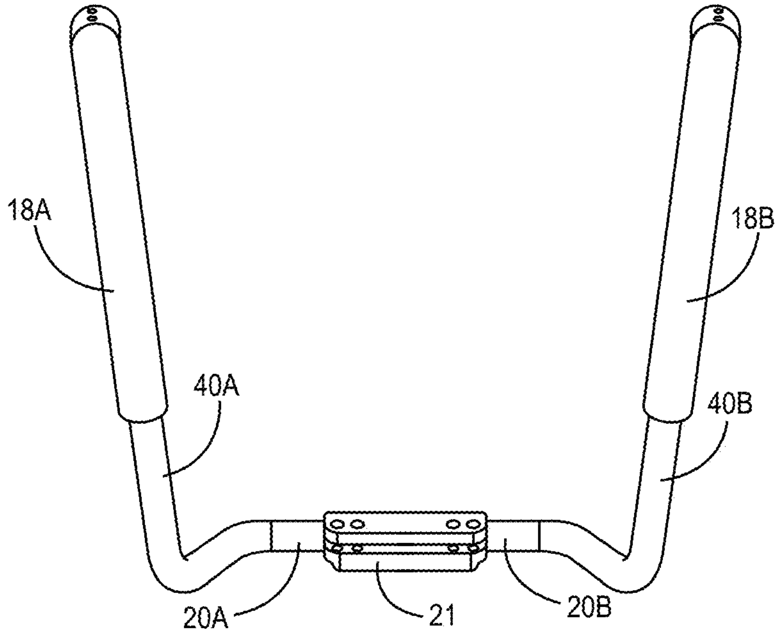
FIGS. 2E and 2F are front perspective views of a front cross member comprising right and left portions and a clamp for supporting a footrest according to some embodiments of this disclosure.
Figure 2F:
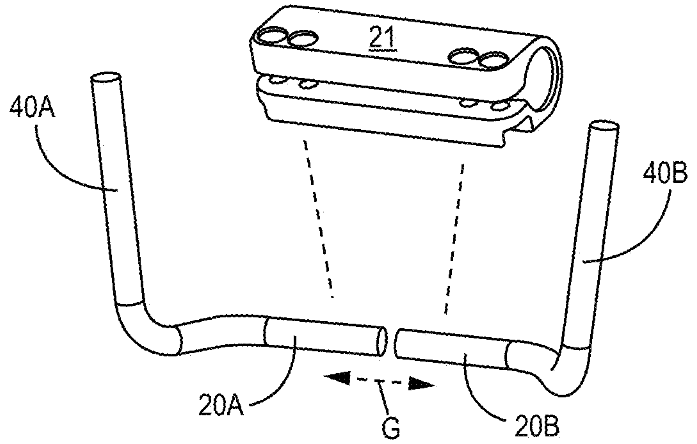

FIGS. 2E and 2F are front perspective views of an embodiment of a wheeled chair 10 having a front cross member comprising right and left portions 20A and 20B, and a clamp 21 for coupling right and left cross member portions 20A and 20B together. In some embodiments, clamp 21 may also be used for supporting a footrest 38 according to some embodiments of this disclosure. FIG. 2E illustrates an embodiment where the downwardly extending portion comprises a right frame element 18A and a left frame element 18B configured to receive the upwardly extending portions 40A and 40B of the front cross member to facilitate adjustment of the height of the lower portions of the cross members 20A and 20B and/or of a footrest 38 disposed thereon. As shown in the particular embodiment of FIG. 2E, frame elements 18A and 18B and upwardly extending portions 40A and 40B taper inward as they extend toward a lower portion of each cross member 20A, 20B. When adjusting the height of the lower portion of cross members 20A and 20B and/or footrest 38 by varying the relative position of the frame elements 18A and 18B and upwardly extending portions 40A and 40B, the inward taper may cause an issue due to the varying width as you move up and down, for example. The embodiment of FIG. 2E is configured to address the varying width by providing a variable sized gap, "G," disposed between the innermost portions of right and left cross members 20A and 20B. For example, clamp 21 may have a number of fasteners (e.g., screws or bolts, not shown) disposed through holes (generally as shown in FIG. 2F) and configured to be tightened to thereby tighten clamp 21 around the ends of cross members 20A and 20B to form a relatively stable platform, e.g., for supporting one or more footrests. The clamp 21 may likewise be loosened via the same fasteners to vary the size of the gap "G" in conjunction with adjusting the height of the footrest (e.g., by varying the up/down positioning of the upwardly extending portions 40A and 40B relative to the frame elements 18A and 18B).

Figure 3A:
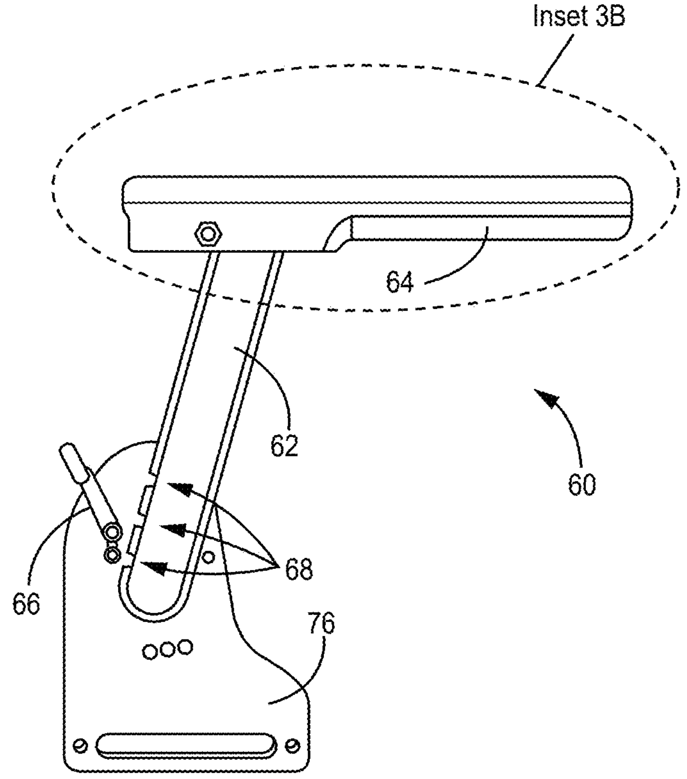
FIGS. 3A-3C are side views of an armrest and/or an armrest support that may be used in conjunction with a shower/commode wheeled chair according to some embodiments of this disclosure.

FIGS. 3A-3D illustrate an embodiment of an arm rest 60 that may be used with the shower/commode wheeled chair 10 of FIG. 1, for example. FIG. 3A shows an arm rest 60 comprising an attachment portion 62 and an arm support portion 64 pivotably coupled to the attachment portion 62. The arm rest 60 may be coupled to the frame 12 directly, or in some embodiments, an arm rest support 76 may be used to couple the arm rest 60 to the frame 12. (Such an embodiment may enable adjustable positioning of the arm rest support 76 relative to the frame 12, for example.) The attachment portion 62 may, for example, comprise a catch/latch mechanism 66 (e.g., incorporated in arm rest support 76, or in a portion of frame 12) which may be configured to enable releasable coupling and/or height adjustment of the arm rest 60 relative to the frame 12. For example, catch/latch mechanism 66 may comprise a spring tensioned engagement mechanism configured to releasably engage a detent position 68 (e.g., one of the notches 68 formed in attachment portion 62 of the arm rest 60). This arrangement may facilitate rapid up/down or vertical adjustment of the arm rest 60, for example. Attachment portion 62 may include at least two detent positions 68 corresponding to at least two preset height adjustments for vertically adjusting the at least one arm rest 60. In some alternate embodiments, the height/vertical adjustment of the one or more arm rests 60 may be configured to be continuously adjustable rather than employing discrete preset height adjustment levels in order to provide more flexible positioning options for patient comfort.

Figure 3B:
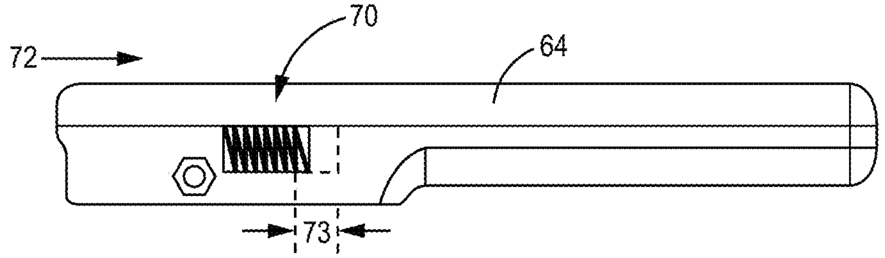
Figure 3C:
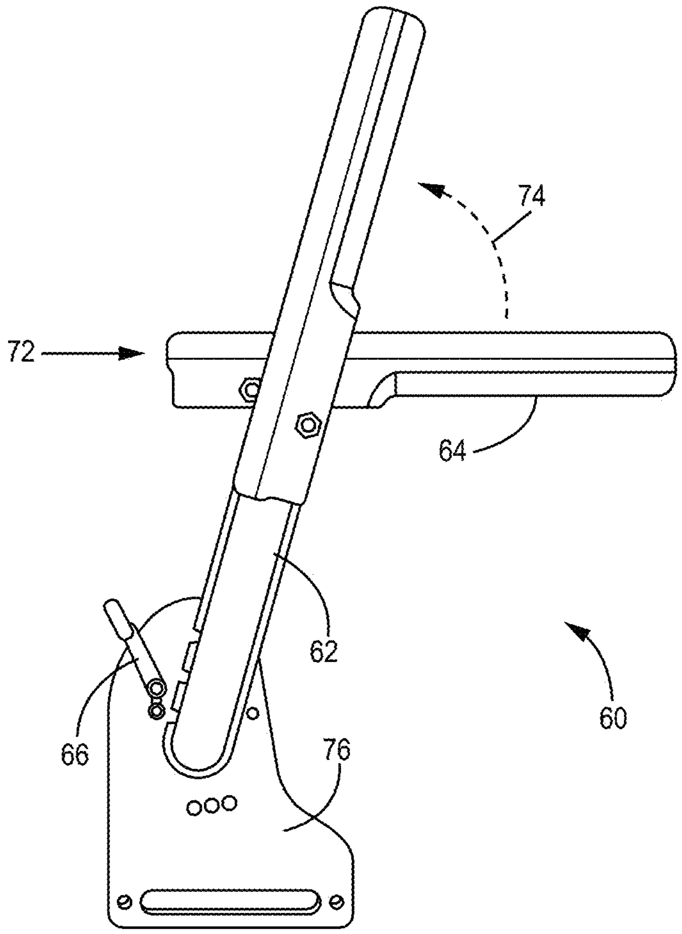

The arm support portion 64 may comprise a spring release mechanism 70, such as shown in the example of FIG. 3B (in partial cross-section, corresponding to "inset 3B" indicated in FIG. 3A). For example, spring release mechanism 70 may be configured to selectively enable pivotable adjustment of the arm support portion 64 relative to the attachment portion 62 upon horizontal movement or displacement 73 of the arm support portion 64 by a certain amount 73. For example, an internal catch or edge may prevent pivotable motion 74 (see FIG. 3C) of arm support portion 64 unless and until arm support portion 64 has been moved sufficiently forward to position the catch beyond an internal obstruction, for example. In some embodiments, a small amount of forward-directed force 72 may be applied to arm support portion 64 to move it a required amount 73 to enable pivotable motion 74, as illustrated in FIGS. 3B and 3C. Arm support portion 64 may be configured to pivot between a generally horizontal position and a generally vertical position as shown in FIG. 3C when pivoted 74 following horizontal displacement 73, for example.

Figure 3D:
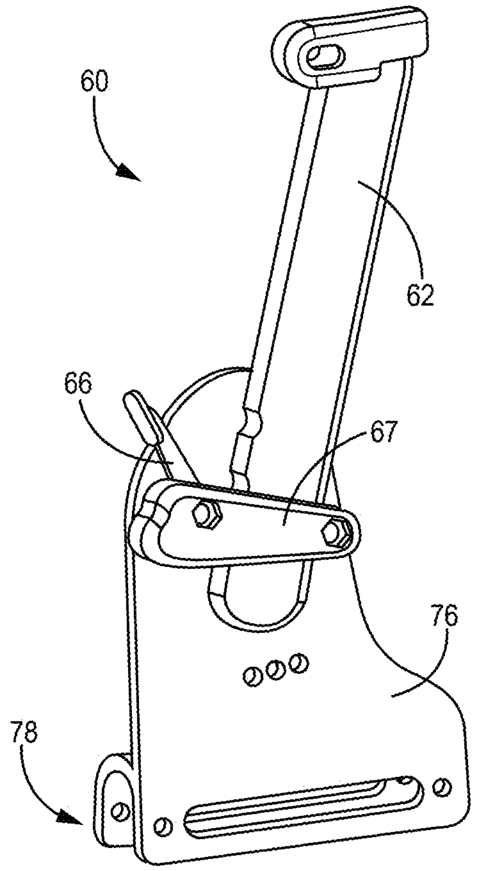
FIG. 3D is a perspective views of portions of an armrest and an armrest support that may be used in conjunction with a shower/commode wheeled chair according to some embodiments of this disclosure.

FIG. 3D is a perspective view of a portion of arm rest 60 (e.g., with arm support portion 64 removed) that shows an attachment coupling 67 that may be employed according to some embodiments, for example, to hold catch/latch mechanism 66 into functional engagement with attachment portion 62 and/or any detent positions 68 formed therein. FIG. 3D also shows an embodiment of arm rest support 76 that may be suited for coupling arm rest 60 to frame 12. The arm rest support 76 of the exemplary embodiment of FIG. 3D has a channel 78 formed in a lower portion thereof for coupling arm rest support 76 to frame 12 of wheeled chair 10. In the particular example depicted in FIG. 3D, the channel 78 may additionally be formed to engage with the contour of a frame 12 having an oval cross-sectional shape, for example, which may thereby improve stability and/or enhance structural integrity. The arm rest support 76 of the exemplary embodiment of FIG. 3D may be a one-piece clamp having an oval-shaped (or partially oval-shaped) channel 78 to help resist rotational movement of arm rest support 76 about a frame having a similar oval-shape. (A similar oval-shaped clamp and frame arrangement may be employed in other portions of wheeled chair 10, such as in conjunction with attaching the footrest and/or footrest coupling 38, 46 to the front portion of the frame.) Of course, embodiments of this disclosure may include one or more arm rests 60 coupled to shower/commode wheeled chair 10, for example, a left arm rest 60 and a right arm rest 60.

In some embodiments, arm rest 60 may alternatively be operably coupled to back support 26. For example, attachment portion 62 of arm rest 60 may be releasably coupled and/or adjustably coupled to right and left frame elements 28 of back support 26, according to some embodiments. The coupling may comprise a locking pin or comparable mechanism that may enable removal of the arm rest 60 from back support 26 and/or may enable angular adjustment of arm rest 60 relative to frame elements 28 of back support 26.

Figure 3E:
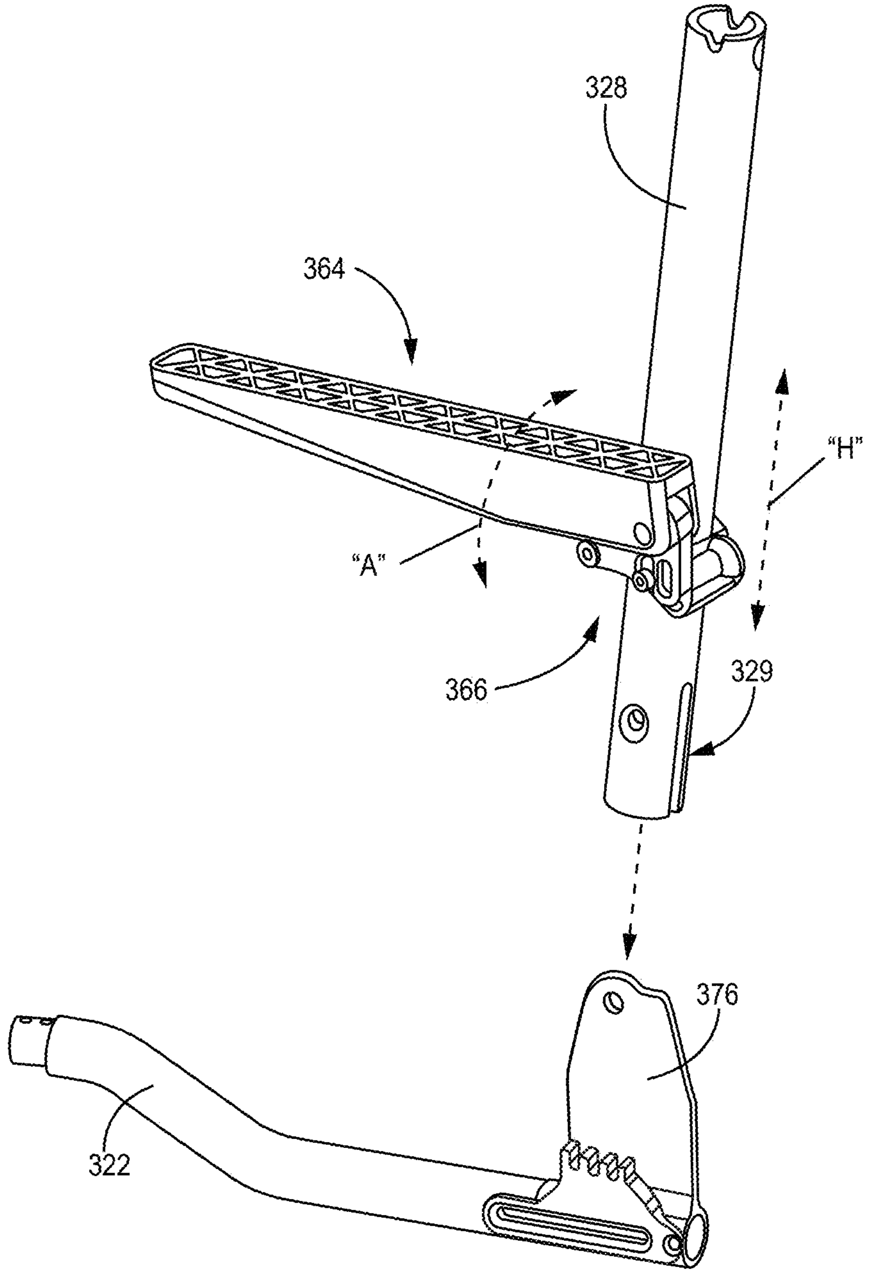
FIG. 3E is a side perspective view of an armrest configured for coupling to a back support of a shower/commode wheeled chair according to some embodiments of this disclosure.

FIG. 3E is a side perspective view of an embodiment of an arm rest 364 configured for coupling to a frame element 328 of a back support of a shower/commode wheeled chair, according to some embodiments of this disclosure. A number of benefits may be derived from the embodiment shown in FIG. 3E. For example, the overall width of the wheeled chair 10 may be reduced or minimized by employing one or more of the features illustrated in FIG. 3E. For example, frame element 328 may comprise a lower slot 329 for receiving an upper portion of support 376, thereby reducing the width of frame element 328 that extends outwardly beyond support 376 in such an embodiment. (Support 376 may be attached to, or integrally formed with, frame element 322 of the seat support portion of wheeled chair 10, according to various embodiments.) Also, arm rest 364 may be coupled to frame element 328 of the back support, rather than to support 376, which may also reduce the overall width. For example, as shown, arm rest 364 may be coupled to frame element 328 via arm rest coupling 366. Arm rest coupling 366 is configured to enable adjustment of the height, "H," of arm rest 364 along frame element 328 in a continuous range of heights, for example. Arm rest coupling 366 may also be configured to be removed, or releasably pivoted upward (e.g., near vertical), or pivoted into series of defined angles, "A," that may correspond to a series of defined angles of the back support (e.g., to retain a mostly horizontal position of arm rest 364 to complement a number of back angle positions).

Figure 3F:
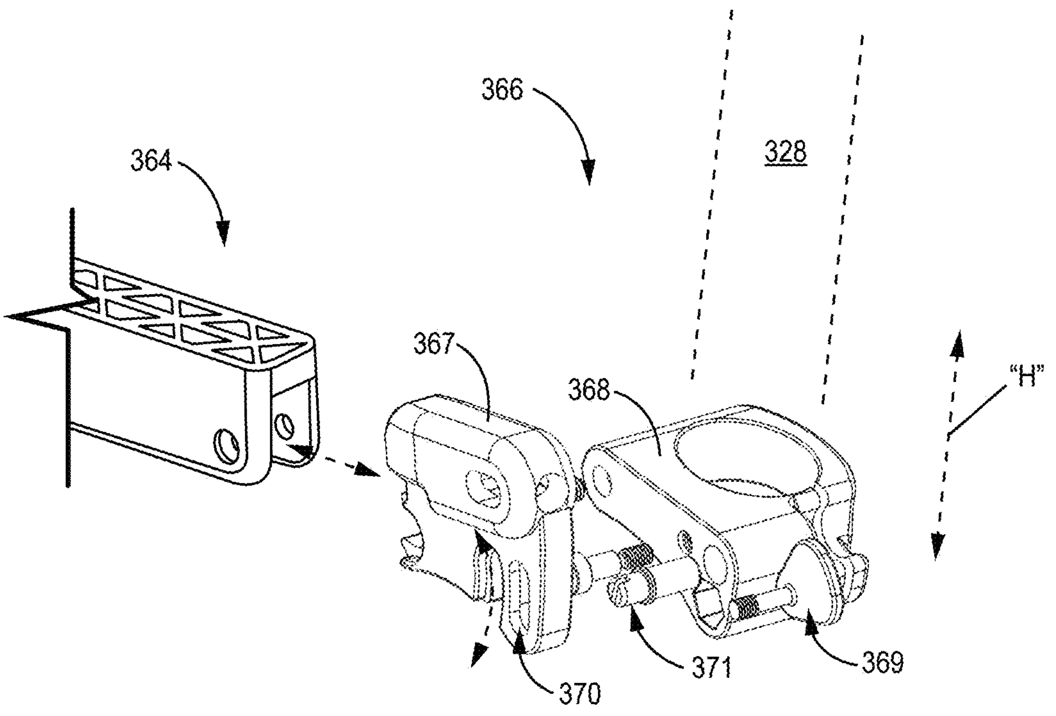
FIG. 3F is an exploded perspective view of a coupling for the armrest embodiment of FIG. 3E.

FIG. 3F is an exploded partial perspective view of the arm rest coupling 366 used with the arm rest 364 embodiment depicted in FIG. 3E. As shown, arm rest coupling 366 may comprise a clamp portion 368 configured to be tightened and loosened around a frame element 328 (indicated by dashed lines) of the back support to enable height adjustment of the arm rest 364 over a continuous range of heights, "H," along frame element 328. Arm rest coupling 366 may also comprise an arm rest pivot portion 367, pivotably coupled to clamp portion 368, and operatively coupled to arm rest 364 so that arm rest 364 can be pivoted relative to clamp portion 368. In some embodiments, clamp portion 368 may include a release lever 369 configured to, upon actuation, enable complete removal of arm rest 364 from wheeled chair 10, along with removal of arm rest pivot portion 367 from clamp portion 368 in some embodiments. Release lever 369 may also enable pivotable movement of arm rest 364 over a series of angular adjustment positions via movement of a pin 371 slidably received within a slot 370 formed in arm rest pivot portion 367. Finally, it should be noted that such an embodiment may also retain the "push forward, tilt upward" feature described above with respect to FIGS. 3A-3C.

Figure 4A:
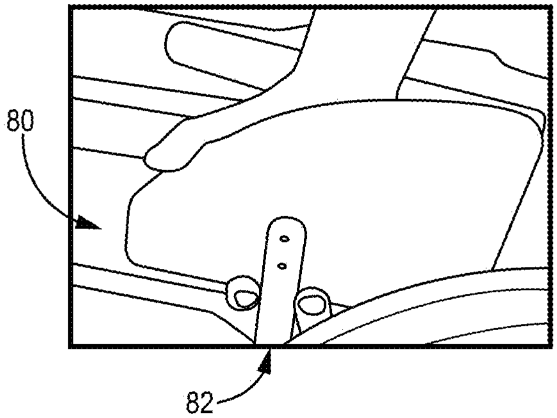
FIGS. 4A and 4B are perspective images of exemplary embodiments of a side guard that may be used in conjunction with a shower/commode wheeled chair according to some embodiments of this disclosure.
Figure 4B:
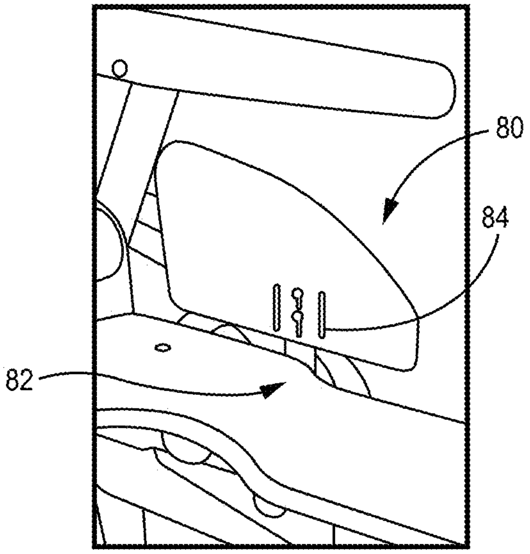

FIGS. 4A and 4B are perspective images showing embodiments of a side guard 80 that may be used with a shower/commode wheeled chair 10 according to some embodiments of this disclosure. Side guard 80 may be removably coupled to the frame 12 adjacent to the seat support portion 14 of the frame 12. In some embodiments, side guard 80 may be configured to be adjusted vertically relative to seat support portion 14 or to other portions of frame 12, for example, via a slidable friction fit. Partially shown in FIG. 4A is a side guard mounting post 82, which may be used to effect a slidable friction fit with a corresponding portion of the frame 12, or with an attachment or coupling thereto. In some embodiments, one or more adjustment slots 84 may be formed in side guard 80 (as best seen in FIG. 4B) to facilitate releasable coupling of side guard 80 to mounting post 82. A particular adjustment slot 84 may enable some amount of vertical adjustment in the positioning of side guard 80, for example. Similarly, a plurality of adjustment slots 84 positioned side by side (as shown in FIG. 4B) may facilitate some amount of forward and backward adjustment of the side guard 80 relative to the seat support portion 14 or other portions of frame 12, according to some embodiments.

Figure 5A:
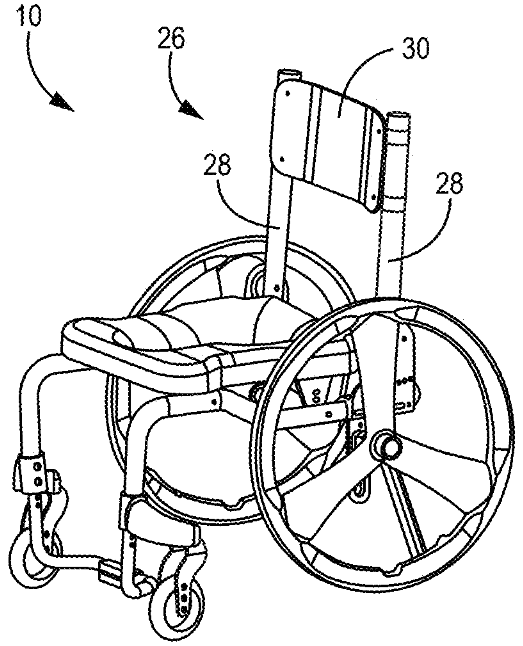
FIGS. 5A-5D are perspective views and images of a shower/commode wheeled chair and an adjustable lateral pad that may be used in conjunction with a shower/commode wheeled chair according to some embodiments of this disclosure.
Figure 5B:
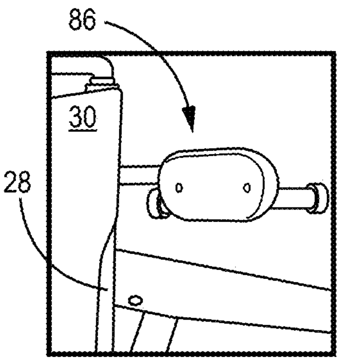
Figure 5C:
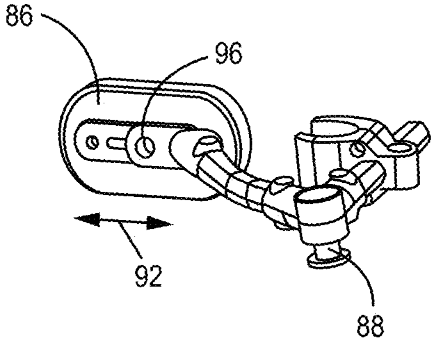
Figure 5D:
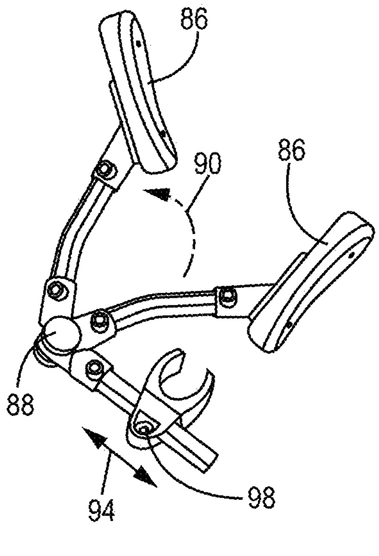

FIGS. 5A-5D show perspective views and an image of a shower/commode wheeled chair 10 that may be configured to further include at least one lateral pad 86 for providing lateral support to a patient seated on chair 10, for example. Such lateral support may be desirable to keep a patient from leaning and/or falling sideways from a seated position on wheeled chair 10. In such embodiments, lateral pad 86 may form a cushioned surface with a generally vertical orientation configured to be placed against a side of a patient (e.g., near the right and left sides of their chest/back area). FIG. 5A shows a back support 26 of chair 10 with potential locations (e.g., on left and right frame elements 28 of back support 26, e.g., near back support surface 30) for coupling a lateral pad 86 thereto. In some embodiments, there may be one or more lateral pads 86 coupled to back support 26, such as that shown in FIG. 5B. In some embodiments, lateral pad 86 may have a release mechanism 88 (e.g., a push-button activated release 88, as seen in FIGS. 5C and 5D) that, when activated, enables pivotably positioning the lateral pad 86 relative to the back support 26 from a patient contact/support position to an outward position 90, as shown in FIG. 5D to facilitate patient egress and ingress, for example. FIGS. 5C and 5D also show adjustable fasteners 96 and 98, respectively. Adjustable fastener 96, for example, may be used to adjust lateral pad 86 in a forward/backward direction 92 (relative to wheeled chair 10), as shown in FIG. 5C. Adjustable fastener 98, for example, may be used to couple the lateral pad 86 to a portion of back support 26 (e.g., to left or right frame element 28), with the ability to adjust the positioning of lateral pad 86 in both an upward/downward direction (e.g., by varying placement vertically along a left or right frame element 28 of back support 26) or in a lateral (e.g., inward/outward) direction 94, as shown in FIG. 5D, for example. In some embodiments, additional links (or arms) may be added to one or more of the lateral pads 86, for example, pivotably coupled via additional release buttons 88. This may be helpful to accommodate a wider range of patient sizes, according to some embodiments.

Figure 5E:
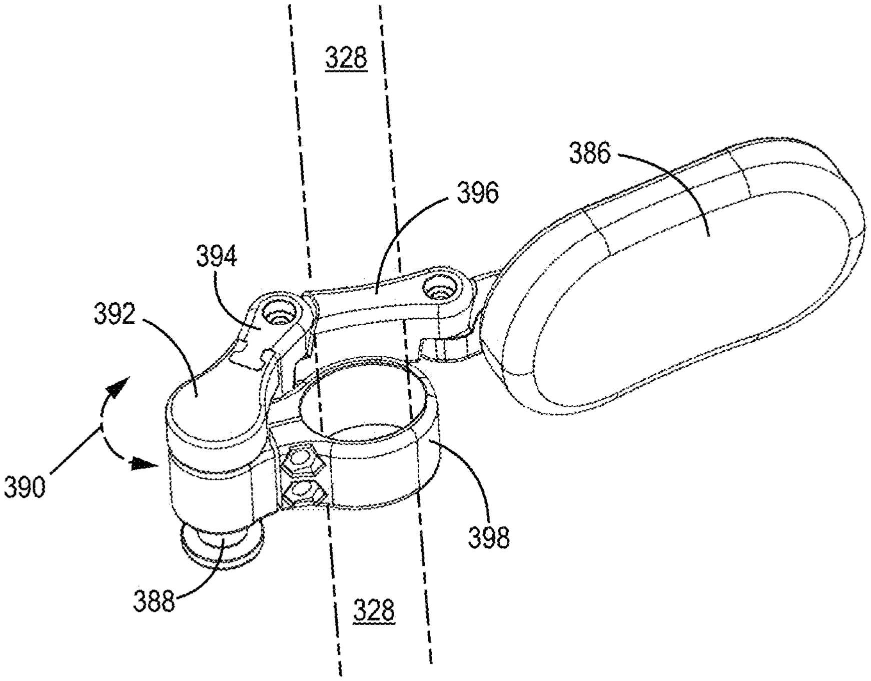
FIG. 5E is a top perspective view of a lateral support configured for coupling to a back support of a shower/commode wheeled chair according to some embodiments of this disclosure.

FIG. 5E is a top perspective view of another embodiment of a lateral pad 386 configured for coupling to a back support of a shower/commode wheeled chair according to some embodiments of this disclosure. In the embodiment depicted, lateral pad 386 is coupled to the right and/or left frame element 328 (partially shown in dotted lines to allow more details of the support arrangement to be shown) via an adjustable fastener 398, configured to adjust the position of lateral pad 386 in an upward/downward direction by loosening and tightening adjustable fastener 398 about frame element 328. Also shown in FIG. 5E is a pushbutton release 388, which can operate against spring tension (not shown) to enable pivotable positioning of the lateral pad 386 to an outward position (indicated by arrow 390) relative to the back support portion of the wheeled chair. Pushbutton 388 may be housed within a portion of adjustable fastener 398 and can be further configured to support and control pivotable actuation of a lateral pivot link 392 in the direction generally indicated by arrow 390, for example. In some embodiments, actuation of pushbutton release 388 quickly enables pivotably repositioning lateral pad 386 to swing out and away from a patient to facilitate rapid egress and ingress of a patient. In some embodiments, the remaining links forming an "arm" of the lateral support arrangement may be adjusted and secured for a particular patient's size and comfort needs so that, when lateral pad 386 is swung back from an outward egress position into a patient support position, it can quickly be returned to its custom, adjusted, patient-specific position.

Figure 5F:
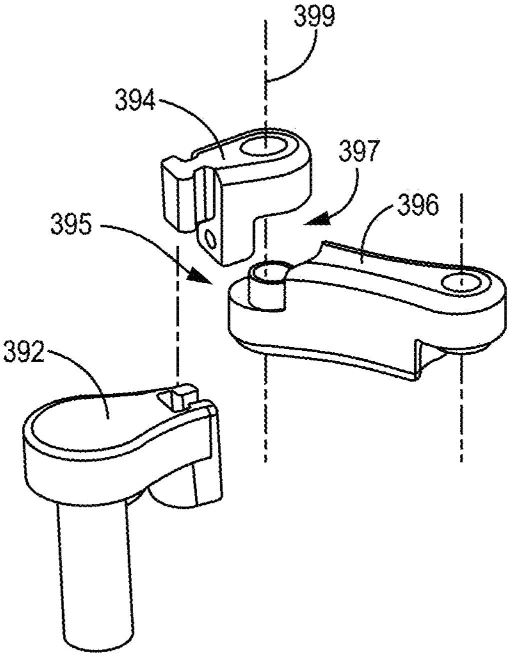
FIG. 5F is an exploded perspective view of a link arrangement for use with the lateral support of FIG. 5E.

In the embodiment of FIG. 5E, a series of links forming the arm of the lateral support arrangement may include the aforementioned lateral pivot link 392, a dovetail link 394 coupled to the lateral pivot link 392 (e.g., via a tongue/groove or comparable friction fit arrangement), and one or more lateral links 396 coupled distal to the dovetail link 394. FIG. 5F is an exploded perspective view of exemplary links that may form portions of the lateral support arrangement of FIG. 5E. For example, in FIG. 5F, the angular positioning of lateral link 396 relative to dovetail link 394 can be varied and secured in place via a fastener (e.g., screw, bolt/nut, etc., not shown) engaged through corresponding openings of links 394 and 396 aligned along a generally vertical axis 399, as shown. In some embodiments, the angular adjustment of links 394 and 396 may be enhanced by the use of corresponding mating surfaces 395 and 397 (e.g., shaped, radial ridges) of links 396 and 394, respectively, that can align and thereby provide a more secure engagement of the various links according to a patient-specific adjustment of relative angles of the links. As noted above, additional lateral links 396 may be added in series as needed to accommodate patients of varying sizes.

Figure 6A:
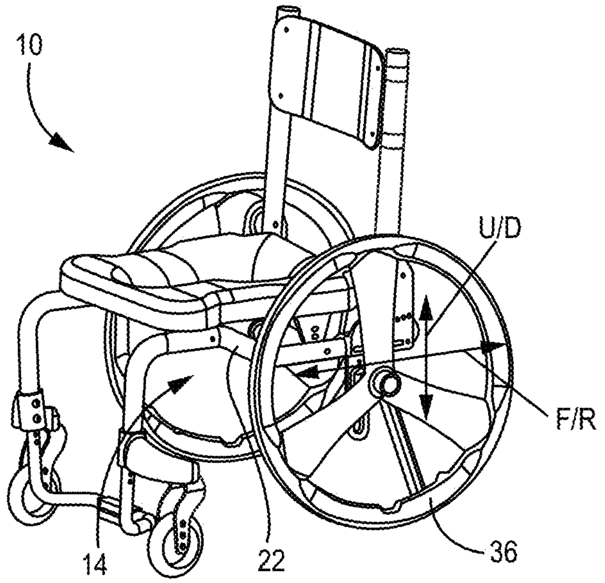
FIGS. 6A-6C are perspective views of a shower/commode wheeled chair and a mechanism for adjusting a center of gravity of a shower/commode wheeled chair according to some embodiments of this disclosure.
Figure 6B:
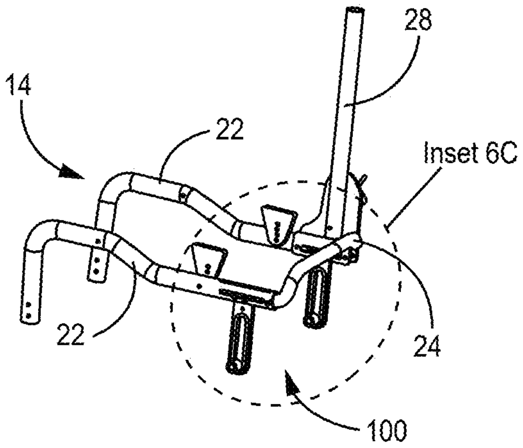
Figure 6C:
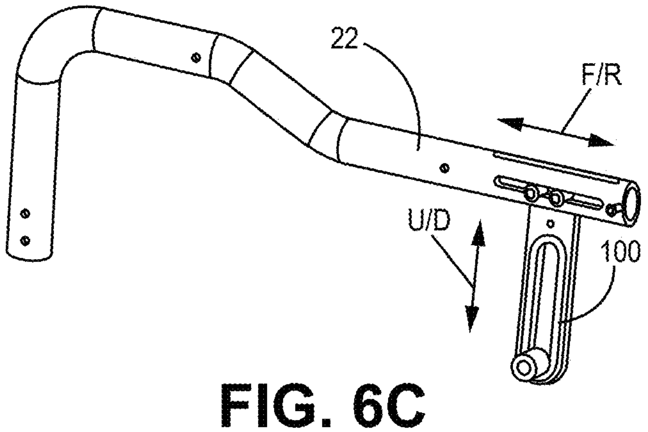

FIGS. 6A-6C are perspective views of a shower/commode wheeled chair 10 having a center of gravity adjustment mechanism 100 (FIGS. 6B and 6C) that may be configured to move the positioning of the rear wheels 36 of shower/commode wheeled chair 10 relative to other elements of wheeled chair 10. For example, the shower/commode wheeled chair 10 depicted in FIG. 6A may comprise at least one center of gravity adjustment mechanism 100 (e.g., a left and a right center of gravity adjustment 100), wherein the center of gravity adjustment 100 is configured to move one or more of the at least two rear wheels 36 forward/backward and/or upward/downward relative to the seat support portion 14. FIG. 6B is a partial exploded perspective view of a shower/commode wheeled chair 10 having a seat support portion 14 formed of left and right frame elements 22 coupled together with a rear cross member 24 near a rear portion of the seat support portion 14. FIG. 6C is an enlarged partial view of the inset from FIG. 6B showing details of a center of gravity adjustment 100 coupled to a frame element 22 of seat support portion 14. In the particular embodiment depicted, center of gravity adjustment 100 is coupled within a slot formed in frame element 22. In some embodiments, frame element 22 may have two slots formed therein to couple and/or adjust positioning of the center of gravity adjustment mechanism 100. For example, center of gravity adjustment 100 may extend downward from a lower slot (not shown) and may be coupled or fastened to frame element 22 via one or more fasteners disposed adjacent a side-facing slot formed in frame element 22 to facilitate forward and/or backward adjustment of center of gravity adjustment 100 (as indicated by "FIR" in FIG. 6C). Additionally, or alternately, center of gravity adjustment 100 may itself have a generally vertically-oriented slot formed therein to facilitate adjustment of the height of the coupling of rear wheels 36 (e.g., via one or more fasteners, such as bolts, etc.) to the center of gravity adjustment 100 (as indicated by "LA)" in FIG. 6C).

Figure 7A:
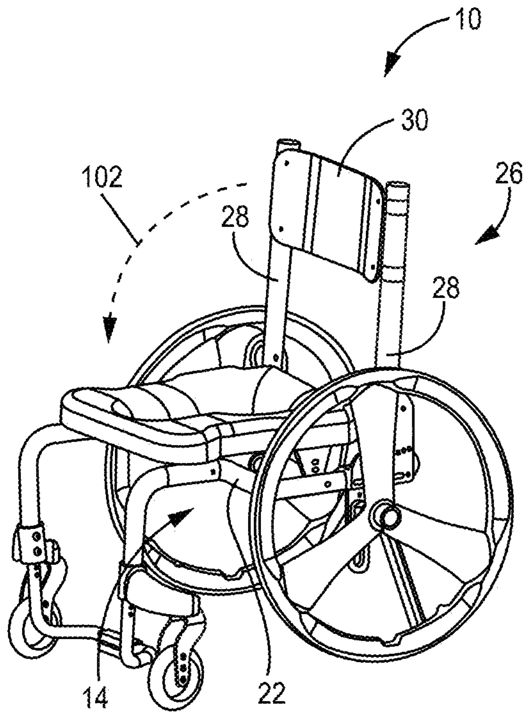
FIGS. 7A and 7B are perspective views of a shower/commode wheeled chair and a back support configured to fold into a generally horizontal arrangement to facilitate storing a shower/commode wheeled chair according to some embodiments of this disclosure.
Figure 7B:
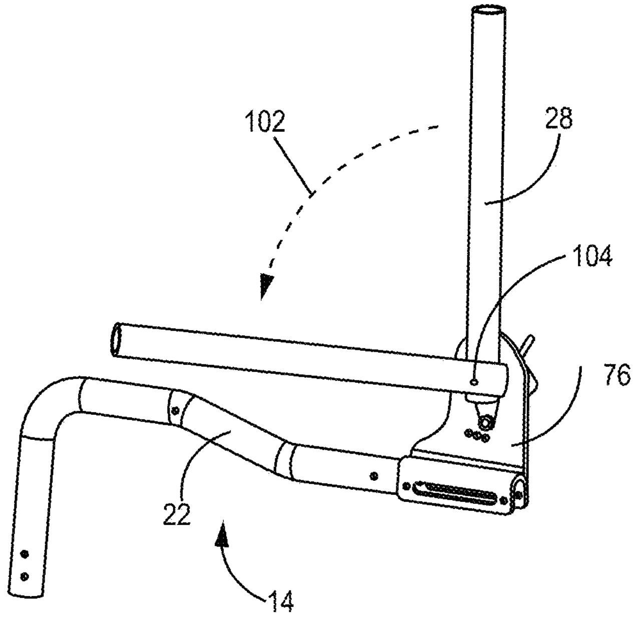

FIGS. 7A and 7B are perspective views of a shower/commode wheeled chair 10 having a back support 26 that is pivotably coupled to the seat support portion 14 to enable folding the back support 26 into a compact configuration that may be suited for storage, for example. FIG. 7A indicates a folding direction 102 that may be actuated by a user (e.g., a patient and/or a caregiver) to place the back support 26 into a position generally parallel to the seat support portion 14, for example, upon actuation of one or more release actuators 104 (see FIG. 7B). For example, as shown in the exploded partial view of FIG. 7B, a release actuator 104 may comprise a pushbutton release that enables a left and/or right frame element 28 to pivot downward/forward (as indicated by reference numeral 102). In some embodiments, release actuator 104 may facilitate adjusting the angle of back support 26, for example to improve patient comfort. In such an embodiment, release actuator 104 may enable adjusting the angle of back support 26 via pivotable motion of frame elements 28 into a number of predefined detent positions, according to some embodiments. Left or right frame element 28 is shown pivotably coupled to arm rest support 76 in the particular example of FIG. 7B, but it could be alternatively coupled to left or right frame element 22, or to rear cross member 24, etc. In some embodiments, one or more release actuators 104 may be further configured to enable vertical adjustment of back support 26. For example, a pushbutton release may enable left and/or right frame elements 28 of back support 26 to move slidably upward or downward relative to seat support portion 14 upon actuation of the pushbutton release, or to fully release the frame elements 28 from the seat support portion 14. In some cases, the pushbutton release may be the same release actuator 104 that enables pivotable folding of the back support 26 via pivotable coupling at arm rest support 76, or it may be a separate release mechanism. In certain embodiments, it may be desirable to enable removal of an arm rest 60 to facilitate folding back support 26 downward into a storage position; in such embodiments, a single pushbutton release may be employed to facilitate rapid release and removal of the arm rest 60 prior to folding of the back support 26.

Figure 7C:
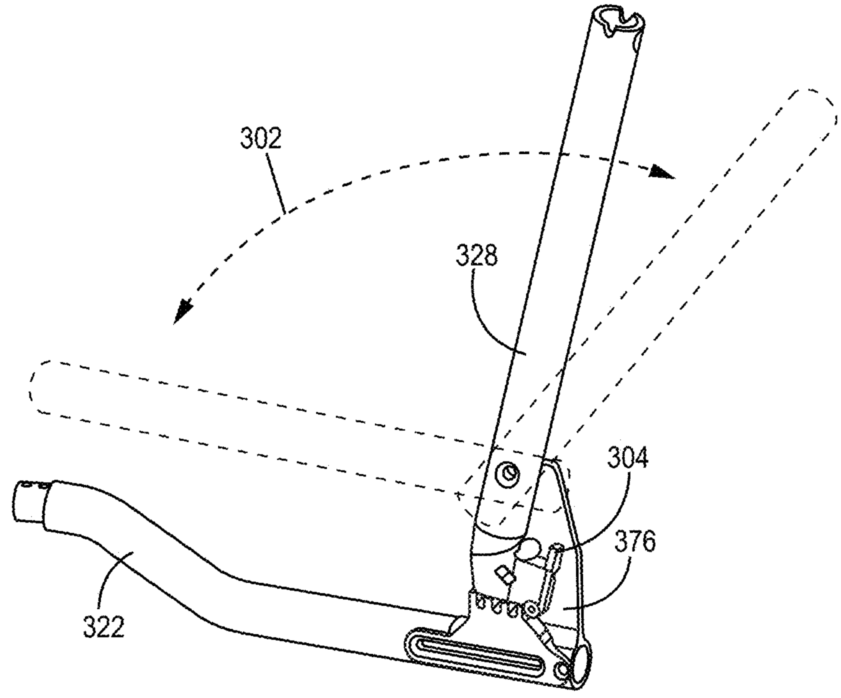
FIG. 7C is a side perspective view of an adjustable/foldable back support for a shower/commode wheeled chair according to some embodiments of this disclosure.

FIG. 7C is a side perspective view of another embodiment of an adjustable/foldable back support for a shower/commode wheeled chair. (FIG. 7C happens to show the elements corresponding to the left side of wheeled chair 10, with it being understood that the right side of wheeled chair 10 would have equivalent corresponding elements for this embodiment.) Frame element 328 of the back support is shown being configured to pivotably move to vary the angle of the back support over a range of angles indicated by curved arrow 302 in FIG. 7C. In the embodiment shown, frame element 328 is pivotably supported near its lower end by support 376. In some embodiments, support 376 may be coupled to, or integrally formed with, frame element 322 of the seat support portion of wheeled chair 10. A back angle release lever 304 is also shown in FIG. 7C. Actuation of back angle release lever 304 may enable repositioning or adjusting the angle of back support (e.g., by changing the angle of the frame elements 328 of the back support). In some embodiments, release lever 304 may enable adjustment of the back angle to a number of predefined positions for patient comfort (e.g., slight adjustments forward and back from a mostly vertical position). Alternatively, or additionally, release lever 304 may enable pivoting or folding the back support of wheeled chair 10 all the way down into a mostly horizontal position (e.g., generally parallel to the seat support portion of wheeled chair 10).

Figure 7D:
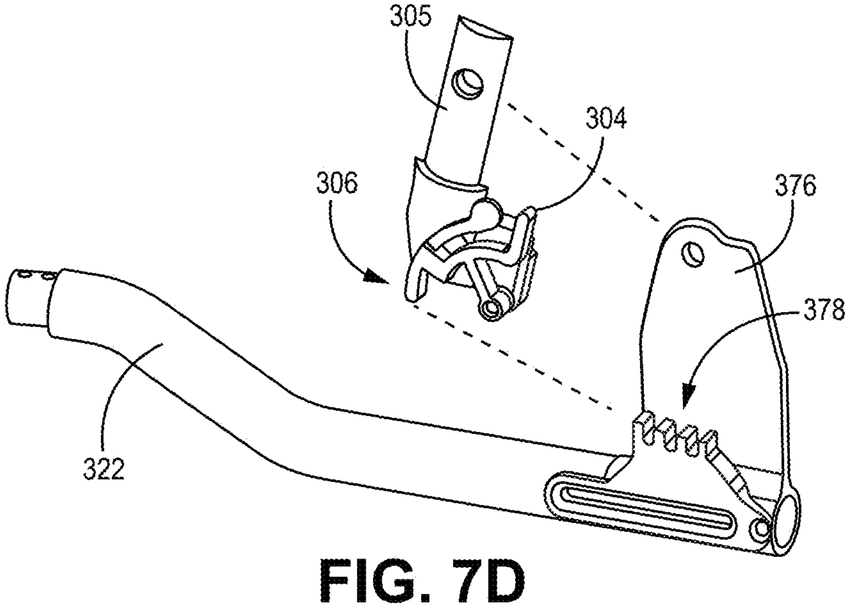
FIG. 7D is an enlarged partially exploded view of an adjustable coupling for use with the adjustable/foldable back support embodiment of FIG. 7C.

FIG. 7D is an enlarged partially exploded view of an adjustable coupling for use with the adjustable/foldable back support embodiment of FIG. 7C. For example, back angle extension 305 may be used to couple frame element 328 to release lever 304, according to some embodiments, although release lever 304 could optionally be coupled to frame element 328 without using extension 305. Release lever 304 is pivotably coupled to extension 305 in the particular embodiment shown and may be spring-tensioned to facilitate releasable engagement of a tab 306 with one or more notches or detent positions 378 associated with support 376. In the embodiment depicted in FIG. 7D, the detent positions 378 may correspond to a series of predefined back angles, such as vertical (0 degrees), slight recline (−7 degrees back), and recline (−14 degrees back), as possible examples. The predefined back angles could vary, of course, but would typically fall in a range within about 45 degrees from vertical in most cases. An additional notch or position 378 may allow folding or pivoting the back support fully forward into a mostly horizontal orientation, which may be suitable for storage of wheeled chair, according to some embodiments.

Figure 8A:
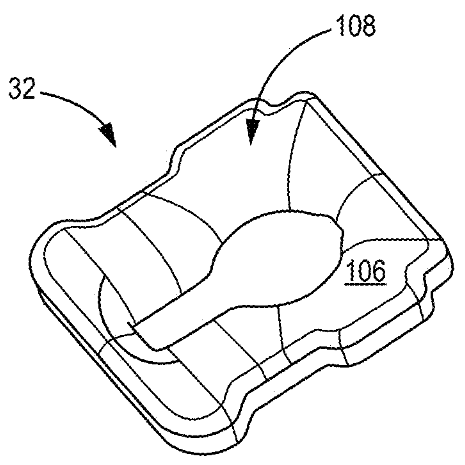
FIGS. 8A and 8B are upper and lower perspective views, respectively, of a shower/commode seat for a shower/commode wheeled chair according to some embodiments of this disclosure.
Figure 8B:
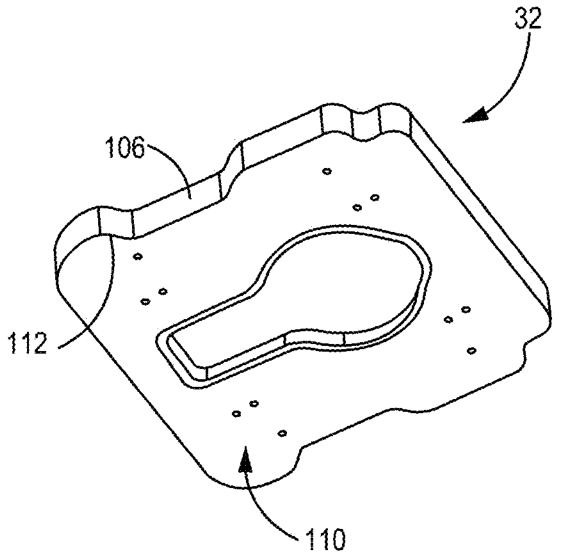

FIGS. 8A and 8B are upper and lower perspective views, respectively, of a shower/commode seat 32 that may be used in conjunction with a shower/commode wheeled chair 10 of this disclosure. FIGS. 8A and 8B together show a shower/commode seat 32 comprising an upper padded side 108, a lower base side 110 (see FIG. 8B), and a cover material 106 that extends over the upper padded side 108 and is secured to the lower base side 110. In some embodiments, cover material 106 may be secured using a plurality of fasteners positioned within a recessed groove 112 formed in the lower base side 110. For example, the plurality of fasteners may include a number of staples, brads, nails, screws, etc. (not shown in FIGS. 8A and 8B), that are applied through the cover material 106 and lodged into the recessed groove 112 of the lower base side 110 to secure the cover material 106 to the shower/commode seat 32. In some embodiments, a sealant is applied over the plurality of fasteners after placement/positioning of the fasteners within the recessed groove 112.

Figure 9A:
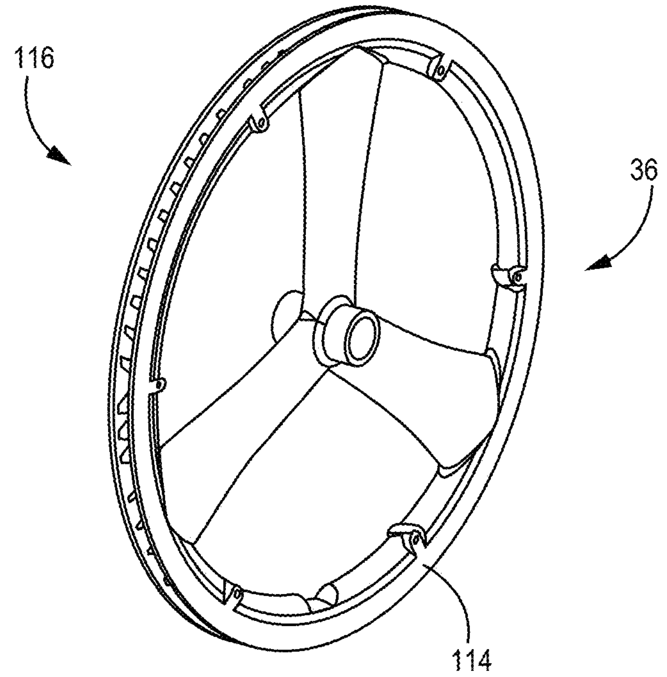
FIGS. 9A-9C are a perspective view, a partial cross-sectional side view, and an exploded perspective view, respectively, of a rear wheel of a shower/commode wheeled chair according to some embodiments of this disclosure.
Figure 9B:
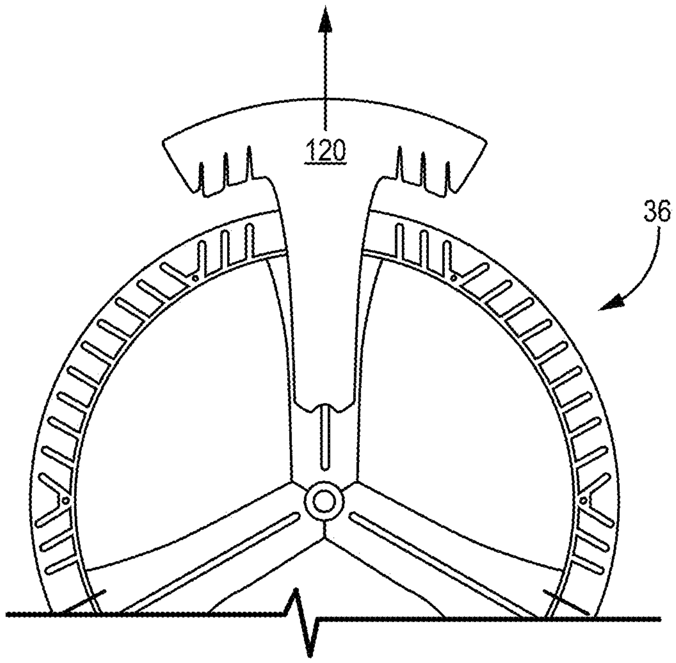
Figure 9C:
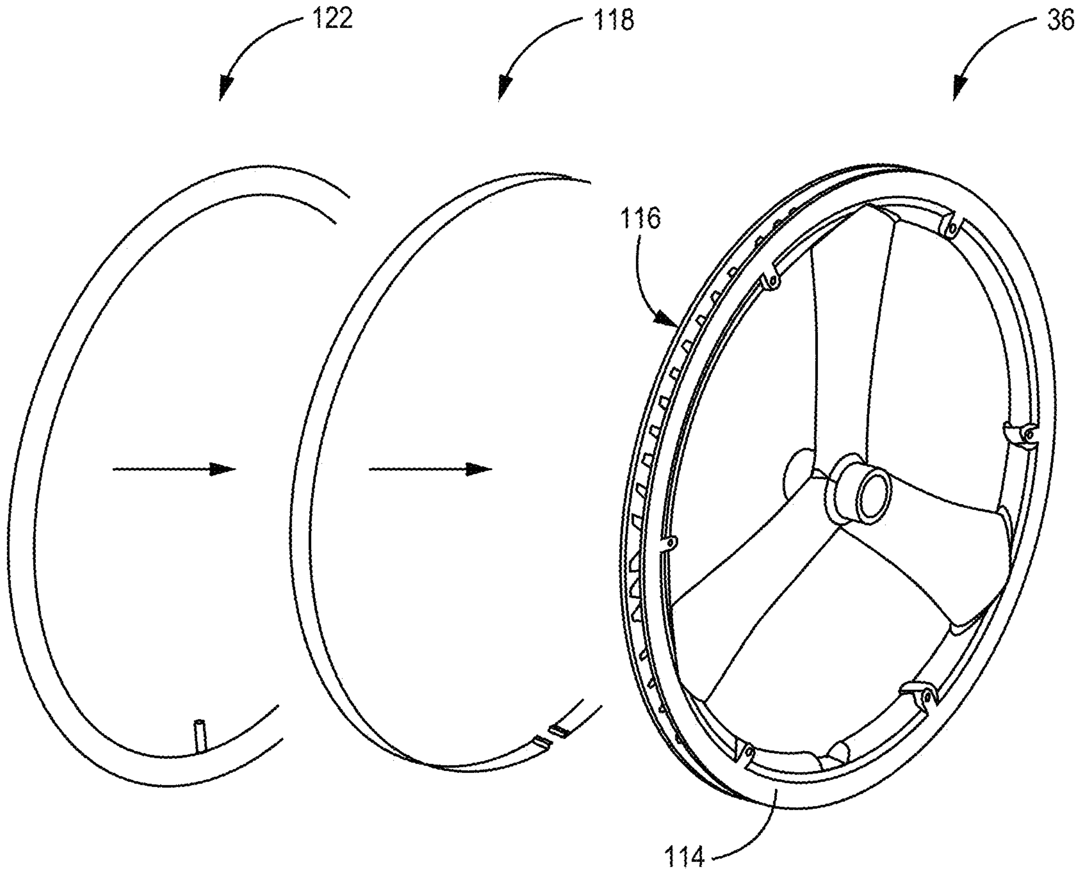

FIGS. 9A-9C illustrate a rear wheel 36 that may be used with a shower/commode wheeled chair 10 according to some embodiments of this disclosure. As noted above, a shower/commode wheeled chair 10 may include a plurality of wheels, including at least two rear wheels 36 coupled to the frame 12 (e.g., directly and/or indirectly, including via the use of a center of gravity adjustment 100 as described hereinabove), and configured to movably support the frame 12. In some embodiments, one or more of the rear wheels 36 may comprise an injection molded material 114 (e.g., a plastic and/or composite material), as shown in FIG. 9A. The injection molded material 114 of rear wheel 36 may form a plurality of internal hollow portions 116 as a result of the injection molding process, as shown. For example, as shown in FIG. 9B, a number of removable core elements 120, may be present during the injection molding process, and may be removed upon completion of injection molding to leave behind the plurality of hollow portions 116. In certain embodiments, the number of removable core elements 120 may range from two to six or more, depending on the nature of the wheel 36 (e.g., number of spokes formed, etc.). The hollow portions 116 may contribute to reducing the overall weight of wheel 36, while retaining the structural strength and/or integrity of the material used in the forming process. A band 118 (e.g., a thin metal band 118, for example), as shown in FIG. 9C, may then be disposed to cover the plurality of hollow portions 116 of the molded wheel 36. The use of band 118 may form a support surface for placement of an inner tube 122 thereabout. The use of band 118 may also serve to prevent inner tube 122 from being pressed into the plurality of hollow portions 116, which may damage inner tube 122 and/or reduce the effectiveness of inner tube 122 at providing a smooth or comfortable ride to a patient seated thereon, for example.

Figure 10A:
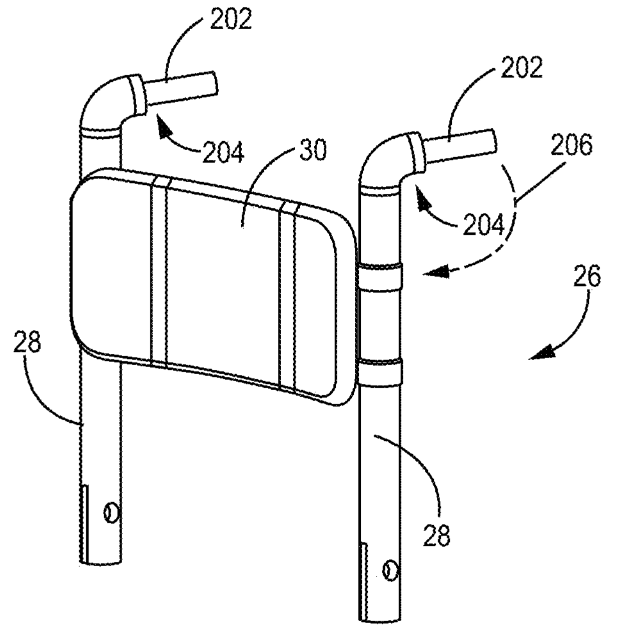
FIG. 10A is a perspective view of a back support for a shower/commode wheeled chair having folding handgrips according to some embodiments of this disclosure.

FIG. 10A is a perspective view of a back support 26 for a shower/commode wheeled chair 10 having folding handgrips 202 according to some embodiments of this disclosure. Handgrips 202 may facilitate moving, pushing/pulling, and maneuvering wheeled chair 10 by a user or assistant. Handgrips 202 may be disposed at or near an upper portion of back support 26. For example, a left handgrip 202 and a right handgrip 202 may be disposed at an upper portion of respective left and right frame members 28 of back support 26, as shown in FIG. 10A. In some embodiments, handgrips 202 may be folding or foldable handgrips 202 configured to fold downward or inward; arrow 206 in FIG. 10A shows a possible folding path for a foldable handgrip 202 that can fold downward, for example, pivoting about a generally horizontal axis. Alternatively, foldable handgrips 202 could be configured to fold inward, or upward, or in some other direction. The folding of handgrips 202 may be beneficial, for example, in positioning the shower/commode wheeled chair directly over a commode/toilet for patient use. The folding of handgrips 202 can thereby lessen the rearward protrusion (or the horizontal footprint) of the shower/commode wheeled chair 10 to enable moving it more fully or directly over a commode in some circumstances. In the particular embodiment depicted in FIG. 10A, a button 204 is disposed on the underside of folding handgrip 202 to unlock the handgrip and enable folding; positioning of the button 204 could be on the underside of folding handgrip 202, as shown in the embodiment of FIG. 10A, or could be disposed in other locations or orientations, although placing button 204 underneath the handgrip 202 may be helpful to avoid ingress of debris, dirt, or liquids into the button mechanism, which may be undesirable.

Figure 10B:
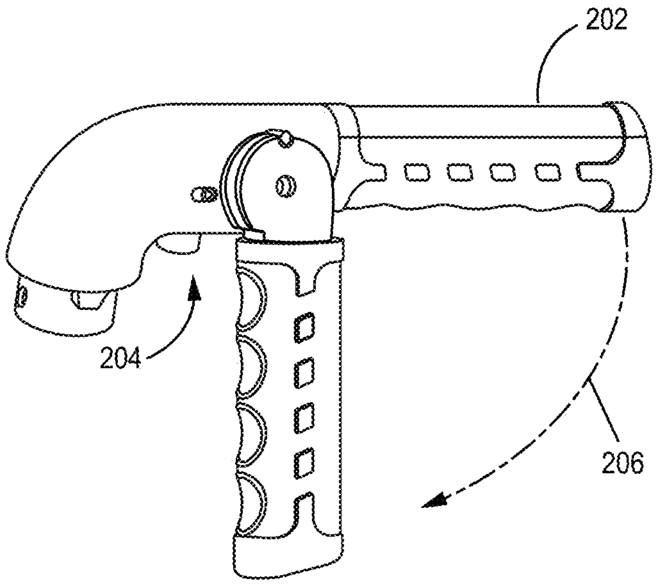
FIGS. 10B-10D are enlarged side perspective views showing details of components of the folding handgrips shown in FIG. 10A.
Figure 10C:
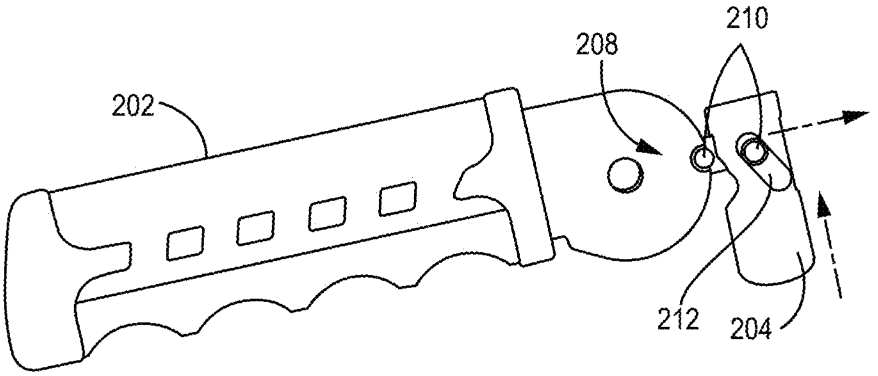
Figure 10D:
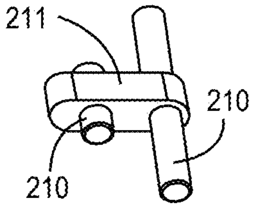

FIGS. 10B-10D are enlarged side perspective views showing details of various components of the folding handgrips 202 of FIG. 10A. FIG. 10B is an enlarged image showing the relative positioning of a handgrip 202 both before folding and after folding downward along folding path 206. The folding is enabled by a pushbutton release (e.g., by pushing button 204) to release a catch mechanism that enables folding of the handgrip 202. When returned to the original horizontal orientation, the handgrip 202 engages a catch and "clicks" back into its normal position. FIG. 10C is a partially exploded view showing certain aspects of the pushbutton release mechanism 204. As shown, upward motion of pushbutton 204 when pressed causes one or more actuating rods 210 to be moved generally horizontally by action of an angled slot 212 formed in button 204; angled slot 212 slidably receives the one or more actuating rods 210. When the actuating rods 210 are moved by actuation of the pushbutton 204, one of the actuating rods 210 disengages from a notch (e.g., a depression, indentation, slot, etc.) formed in a portion of handgrip 202, thereby enabling folding (e.g., pivoting of the handgrip 202, downward in the example illustrated). FIG. 10D is an enlarged top perspective view of an exemplary actuation member 211, having a pair of actuating rods 210 extending laterally therefrom, and configured to be actuated upon pressing of button 204 upward. Other comparable mechanisms for effectuating a releasable pivotable (folding) handgrip arrangement are contemplated and would be deemed to be within the scope of this disclosure.

Various examples have been described with reference to the accompanying drawing figures. These and other alternatives and variations are contemplated and are deemed to be within the scope of the following claims.

What is claimed is:

1. A shower/commode wheeled chair adapted to be locatable over a commode comprising:

a frame comprising a seat support portion and a front portion extending downwardly from the seat support portion, the front portion comprising left and right frame elements and a front cross member coupling the left and right frame elements of the front portion near a bottom portion thereof, the seat support portion comprising left and right frame elements and a rear cross member coupling the left and right frame elements of the seat support portion near a rear portion thereof;

a back support coupled to the seat support portion, the back support comprising left and right frame elements and a back support surface extending between the left and right frame elements of the back support;

a shower/commode seat supported by the seat support portion of the frame;

a plurality of wheels coupled to the frame and configured to movably support the frame and to define a space beneath the seat support portion to facilitate moving the shower/commode wheeled chair over a commode; and at least one footrest coupled to the front portion, the at least one footrest being pivotably coupled to pivot about a generally horizontal axis, the footrest further being rotatably coupled to rotate about a generally vertical axis.

2. The shower/commode wheeled chair of claim 1 wherein the at least one footrest comprises a left footrest and a right footrest.

3. The shower/commode wheeled chair of claim 1 wherein the at least one footrest is configured to be removable from the front portion of the frame.

4. The shower/commode wheeled chair of claim 1 wherein the at least one footrest is rotatably coupled to rotate about either the right frame element or the left frame element of the downwardly extending front portion.

5. The shower/commode wheeled chair of claim 1 wherein the at least one footrest is rotatably coupled to rotate about either a right upwardly extending portion or a left upwardly extending portion of the front cross member.

6. The shower/commode wheeled chair of claim 1 wherein the at least one footrest is coupled to the front portion via a footrest coupling, the footrest coupling comprising an upper portion and a lower portion, the upper and lower portions each including an indexing feature, wherein the indexing feature of the footrest coupling is configured to selectively enable rotation of the at least one footrest about the right or left upwardly extending portion of the front cross member via vertical displacement of the upper portion relative to the lower portion.

7. The shower/commode wheeled chair of claim 1 wherein the front cross member comprises a right front cross member, a left front cross member, and a clamp configured to clamp the right front cross member to the left front cross member with a gap therebetween.

8. The shower/commode wheeled chair of claim 7 wherein the right front cross member and the left front cross member each has an upwardly extending portion that tapers such that the gap between the right front cross member and the left front cross member varies in size when a height of the right and left front cross members is adjusted, and wherein the clamp is configured to clamp the right front cross member to the left front cross member to accommodate changes in gap size.

9. A shower/commode wheeled chair adapted to be locatable over a commode comprising:

a frame comprising a seat support portion and a front portion extending downwardly from the seat support portion, the front portion comprising left and right frame elements and a front cross member coupling the left and right frame elements of the front portion near a bottom portion thereof, the seat support portion comprising left and right frame elements and a rear cross member coupling the left and right frame elements of the seat support portion near a rear portion thereof;

a back support coupled to the seat support portion, the back support comprising left and right frame elements and a back support surface extending between the left and right frame elements of the back support;

a shower/commode seat supported by the seat support portion of the frame;

a plurality of wheels coupled to the frame and configured to movably support the frame and to define a space beneath the seat support portion to facilitate moving the shower/commode wheeled chair over a commode; and at least one arm rest releasably coupled to the wheeled chair, the arm rest comprising an attachment portion and an arm support portion pivotably coupled to the attachment portion, the attachment portion configured to adjust a height of the arm rest, the arm support portion comprising a spring release mechanism configured to selectively enable pivotable adjustment of the arm support portion relative to the attachment portion upon horizontal displacement of the arm support portion.

10. The shower/commode wheeled chair of claim 9 wherein the attachment portion comprises a catch/latch mechanism configured to operably couple the arm rest to the frame of the wheeled chair.

11. The shower/commode wheeled chair of claim 9 wherein the attachment portion comprises a clamp portion configured to releasably couple to one of the left and right frame elements of the back support at an adjustable height, and wherein the arm support portion comprises a pivot portion pivotably coupled to the clamp portion.

12. The shower/commode wheeled chair of claim 11 wherein the clamp portion comprises a release lever configured to, upon actuation, either:

(a) enable removal of the arm rest from the wheeled chair, or (b) enable pivotable adjustment of the arm rest relative to one of the left and right frame elements of the back support.

13. The shower/commode wheeled chair of claim 11 wherein the left and right frame elements of the back support are pivotably coupled to the seat support portion to enable folding the back support into a horizontal configuration generally parallel to the seat support portion upon actuation of one or more release actuators.

14. The shower/commode wheeled chair of claim 11 wherein the left and right frame elements of the back support are pivotably coupled to the seat support portion to enable adjusting an angle of the back support upon actuation of one or more release actuators.

15. The shower/commode wheeled chair of claim 9 further comprising at least one lateral pad operably coupled to one of the left and right frame elements of the back support, the at least one lateral pad configured to provide lateral support to a patient seated on the wheeled chair.

16. The shower/commode wheeled chair of claim 15 wherein the at least one lateral pad is operably coupled to one of the left and right frame elements of the back support via a link arrangement, the link arrangement comprising:

(a) a first link pivotably coupled to one of the left and right frame elements of the back support, the first link having a pushbutton release configured to enable pivotable rotation of the first link about one of the left and right frame elements of the back support upon actuation of the pushbutton release; and (b) at least one lateral link coupled to the first link at an adjustable angle therebetween, the adjustable angle between the lateral link and the first link being at least partially maintained by one or more corresponding mating surfaces formed between the lateral link and the first link.

17. The shower/commode wheeled chair of claim 9 further comprising one or more handgrips disposed near an upper portion of the wheeled chair.

18. The shower/commode wheeled chair of claim 17 wherein the one or more handgrips is configured to fold about a pivot axis upon actuation of a release button.

19. A shower/commode wheeled chair adapted to be locatable over a commode comprising:

a frame comprising a seat support portion and a front portion extending downwardly from the seat support portion, the front portion comprising left and right frame elements and a front cross member coupling the left and right frame elements of the front portion near a bottom portion thereof, the seat support portion comprising left and right frame elements and a rear cross member coupling the left and right frame elements of the seat support portion near a rear portion thereof;

a back support coupled to the seat support portion, the back support comprising left and right frame elements and a back support surface extending between the left and right frame elements of the back support;

a shower/commode seat supported by the seat support portion of the frame; and a plurality of wheels coupled to the frame and configured to movably support the frame and to define a space beneath the seat support portion to facilitate moving the shower/commode wheeled chair over a commode wherein the left and right frame elements of the back support are configured to be pivotably adjusted to a range of back angles via actuation of a back angle release lever, the range of back angles including:

(a) a storage configuration with the left and right frame elements of the back support pivoted forward to a generally horizontal position; and (b) at least two patient preference back angles.

20. The shower/commode wheeled chair of claim 19 wherein the at least two patient preference back angles of the back support comprises three predefined back angles within 45 degrees of vertical.

21. The shower/commode wheeled chair of claim 19 further comprising an arm rest pivotably coupled to one of the left and right frame elements of the back support, the arm rest being coupled to the back support via an arm rest coupling, the arm rest coupling comprising a clamp portion configured to adjust a height of the arm rest relative to the back support, the arm rest coupling further comprising a pivot portion pivotably coupled to the clamp portion, the pivot portion configured to pivot relative to the clamp portion.

22. The shower/commode wheeled chair of claim 21 wherein the pivot portion of the arm rest coupling is configured to adjust an angle of the arm rest relative to the back angle of the back support to maintain a generally horizontal orientation of the arm rest.

23. The shower/commode wheeled chair of claim 21 wherein the arm rest is configured to be released from the clamp portion to facilitate pivotably adjusting the back support to the storage configuration.

24. The shower/commode wheeled chair of claim 21 wherein the arm rest further comprises an arm support portion having a spring release mechanism configured to selectively enable pivotable motion of the arm support portion relative to the clamp portion upon horizontal displacement of the arm support portion.

25. The shower/commode wheeled chair of claim 19 further comprising one or more handgrips disposed near an upper portion of the wheeled chair, the one or more handgrips being configured to fold about a pivot axis upon actuation of a release button.

26. The shower/commode wheeled chair of claim 19 further comprising at least one lateral pad operably coupled to one of the left and right frame elements of the back support, the at least one lateral pad configured to provide lateral support to a patient seated on the wheeled chair, the at least one lateral pad being operably coupled to one of the left and right frame elements of the back support via a link arrangement, the link arrangement comprising:

(a) a first link pivotably coupled to one of the left and right frame elements of the back support, the first link having a pushbutton release configured to enable pivotable rotation of the first link about one of the left and right frame elements of the back support upon actuation of the pushbutton release; and (b) at least one lateral link coupled to the first link at an adjustable angle therebetween, the adjustable angle between the lateral link and the first link being at least partially maintained by one or more corresponding mating surfaces formed between the lateral link and the first link.

27. A shower/commode wheeled chair adapted to be locatable over a commode comprising:

a frame comprising a seat support portion and a front portion extending downwardly from the seat support portion, the front portion comprising left and right frame elements and a front cross member coupling the left and right frame elements of the front portion near a bottom portion thereof, the seat support portion comprising left and right frame elements and a rear cross member coupling the left and right frame elements of the seat support portion near a rear portion thereof;

a back support coupled to the seat support portion, the back support comprising left and right frame elements and a back support surface extending between the left and right frame elements of the back support;

a shower/commode seat supported by the seat support portion of the frame;

a plurality of wheels coupled to the frame and configured to movably support the frame; and at least one arm rest releasably coupled to the frame, the arm rest comprising an attachment portion and an arm support portion pivotably coupled to the attachment portion, the attachment portion comprising a catch/latch mechanism that enables releasable coupling and height adjustment of the arm rest relative to the frame, the arm support portion comprising a spring release mechanism configured to selectively enable pivotable adjustment of the arm support portion relative to the attachment portion upon horizontal displacement of the arm support portion.

28. The shower/commode wheeled chair of claim 27 wherein the catch/latch mechanism of the attachment portion includes at least two preset height adjustments for vertically adjusting the at least one arm rest.

29. The shower/commode wheeled chair of claim 27 wherein the arm support portion is configured to pivot between a generally horizontal position and a generally vertical position.

30. A shower/commode wheeled chair adapted to be locatable over a commode comprising:

a frame comprising a seat support portion and a front portion extending downwardly from the seat support portion, the front portion comprising left and right frame elements and a front cross member coupling the left and right frame elements of the front portion near a bottom portion thereof, the seat support portion comprising left and right frame elements and a rear cross member coupling the left and right frame elements of the seat support portion near a rear portion thereof;

a back support coupled to the seat support portion, the back support comprising left and right frame elements and a back support surface extending between the left and right frame elements of the back support;

a shower/commode seat supported by the seat support portion of the frame;

a plurality of wheels coupled to the frame and configured to movably support the frame; and at least one lateral pad coupled to the back support, the at least one lateral pad having a release mechanism for pivotably positioning the lateral pad relative to the back support.

31. The shower/commode wheeled chair of claim 30 wherein the release mechanism for the at least one lateral pad is a pushbutton release that enables pivoting the lateral pad about the pushbutton release to an outward position to facilitate patient egress, and wherein the lateral pad is further configured to be adjusted inward/outward and forward/backward.

32. A shower/commode wheeled chair adapted to be locatable over a commode comprising:

a frame comprising a seat support portion and a front portion extending downwardly from the seat support portion, the seat support portion comprising left and right frame elements and a rear cross member coupling the left and right frame elements of the seat support portion near a rear portion thereof;

a back support coupled to the seat support portion;

a shower/commode seat supported by the seat support portion of the frame; and a plurality of wheels coupled to the frame and configured to movably support the frame, the plurality of wheels comprising at least two rear wheels, wherein at least one of the rear wheels comprises an injection molded plastic having a plurality of internal hollow portions, and a metal band disposed to cover the plurality of internal hollow portions and form a support for an inner tube, wherein the injection molded plastic of the at least one rear wheel is formed by a process including removing one or more removable core elements.

* * * * *